March 22, 1927.     E. M. CATTLEY     1,621,492
INDICATOR FOR LEAKING AIR, GASES, AND THE LIKE
Filed April 25, 1925
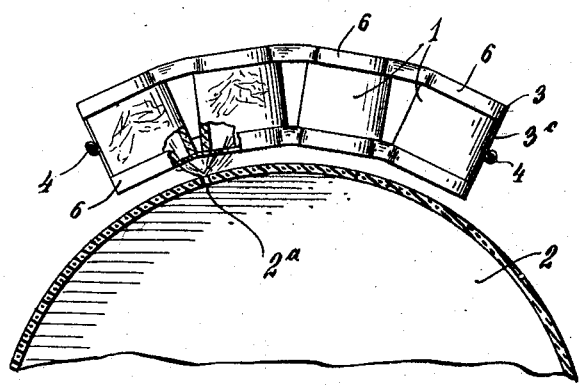
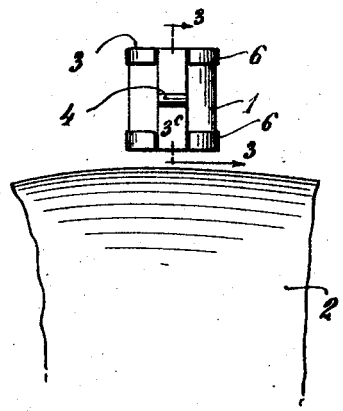
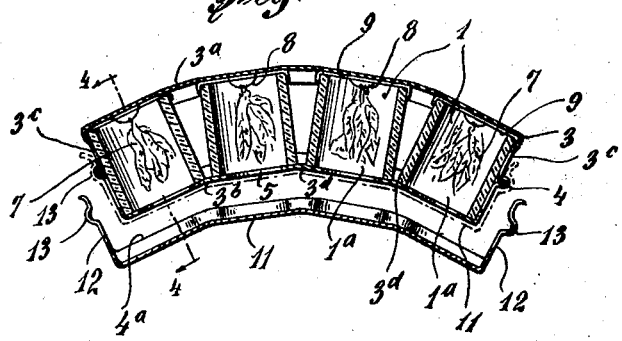
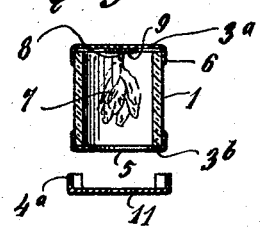
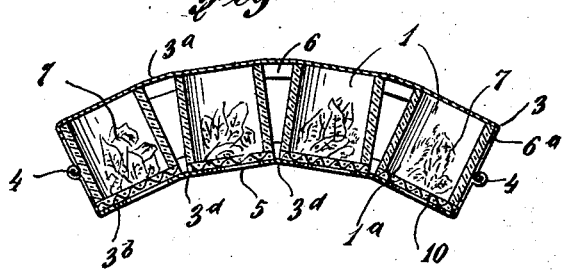
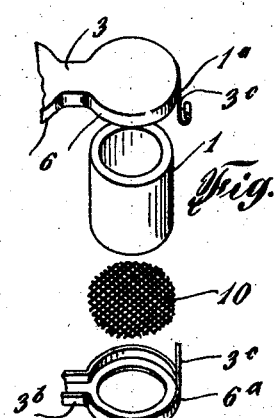
INVENTOR
Ernest M. Cattley
BY  T. P. Bourne
ATTORNEY Patented Mar. 22, 1927.

1,621,492

UNITED STATES PATENT OFFICE.

ERNEST M. CATTLEY, OF NEW YORK, N. Y.

INDICATOR FOR LEAKING AIR, GASES, AND THE LIKE.

Application filed April 25, 1925. Serial No. 25,811.

My invention relates to improvements in means adapted to indicate the location of escaping air, gas and the like, and my invention has particular reference to locating punctures, cracks, or the like in pneumatic tires under air pressure. Since punctures or air leaks in a pneumatic tire may be in any location around the surface of the inner tube an object of my invention is to provide an indicator so constructed as to span a considerable portion of the outer surface of the tube in an annular direction, so that when the indicator is moved along the surface of the tube the location of the puncture or the like may be quickly ascertained. In order to locate a puncture in a pneumatic tire tube it has been customary to wet the surface of the tube or to place the latter within water to note from air bubbles the location of a puncture, but under many circumstances of use of pneumatic tires water for such purposes is not at hand, so that under all circumstances with my improved indicator a person is enabled without the use of water to readily locate a puncture in an inflated tube.

In carrying out my invention I provide an indicator having a plurality of spaced chambers arranged in a row of such length as to span a considerable portion of the outer surface of an inflated tire inner tube, such chambers having inlets for air, and each chamber is provided with a movable indicating member of such light weight as to be agitated when air under pressure enters the chamber to visually indicate the location of a puncture in a tube.

My invention also comprises novel details of improvement that will be more fully hereinafter set forth and then pointed out in the claims.

Reference is to be had to the accompanying drawings forming a part hereof, wherein Fig. 1 is an elevation illustrating my improved indicator in position for use;

Fig. 2 is a side view of Fig. 1;

Fig. 3 is a section on line 3, 3, in Fig. 2;

Fig. 4 is a cross section on the plane of line 4, 4, in Fig. 3;

Fig. 5 is a longitudinal section illustrating a modification; and

Fig. 6 is a perspective detail view.

Similar numerals of reference indicate corresponding parts in the several views.

My improved indicator comprises a series of chambers or containers 1, arranged side by side in a row, having open ends at 1ª projecting in the same direction adapted to oppose an inner tube 2 of a pneumatic tire or other element containing air, gas or the like under pressure. The chambers 1 are secured together by means of a frame 3 shown comprising strips of material 3ª, 3ᵇ, which may be of metal, extending along opposite ends of the chambers and along the sides of the endmost chambers at the projections 3ᶜ, where the ends of the strips are secured together, as by rolling or seaming said ends at 4, whereby the chambers are permanently secured in spaced relation. The strip 3ᵇ is provided with spaced openings 5 registering with the adjacent open ends of the chambers for the admission of air under pressure into the several chambers. The chambers 1 may be in the form of glass tubes, and in order to retain the tubes in position in spaced relation I provide the strips 3ª, 3ᵇ with flanges 6 which have portions curved in such a way as to partially enclose the edges of the chambers at their ends in the form of seats, the flanges 6 at the ends of the strips 3ª, 3ᵇ being continued completely around the lateral sides of the chamber at 6ª, as indicated in Fig. 6, to retain the chambers. The partial encircling of the ends of the chambers by the flanges 6 serve to retain the chambers from lateral displacement in various directions. In accordance with the construction described the chambers radiate in such a way that their inner ends are substantially in a circle so as to follow the contour of the tube 2 when the indicator is held over the same so as to span a considerable annular extent of the tube, as indicated in Fig. 1.

Within the chambers 1 I place relatively light-weight members 7 adapted to be agitated when a stream of air or gas under pressure is projected against the same. The members 7 may be relatively small bunches of down, silk floss, feathers or fibers of sufficiently light weight to be agitated or moved about to be detected to indicate a leak of air or the like under pressure entering the chambers. In the form shown in Fig. 3 the members 7 are suspended from the outer portions of the chambers by means of threads 8 attached to strips 9, which may be of paper, shown clamped between the chambers 1 and the frame strip 3ª in such a manner that when a stream of air or the like under pressure enters a chamber the hanging member 7 will be agitated. The members 7 are retained in operative position by the strings 8 and strips 9.

In Fig. 5 the members 7 are loosely disposed within chambers 1, and are retained therein by means of foraminous screens 10, such as wire netting, located at the open ends 1ª of the chambers. The screens are shown retained between the frame strip 3ᵇ and the adjacent end of the corresponding chamber 1. The construction is such that when air of the like under pressure enters one of the chambers the member 7 will be agitated or blown about to indicate a leak.

In order to protect the inner open ends of the chambers I provide a cap 11, shown in the form of a strip having marginal flanges 4ª adapted to enclose the corresponding portions of strip 3ᵇ, which cap has projecting end portions 12 provided with indentures 13 adapted to engage the projecting ends 4 for detachably retaining the cap on the indicator, as indicated in dotted lines in Fig. 3.

In accordance with my improvement the indicator may be held adjacent to a tube 2 and advanced around the same, either circumferentially or laterally, in such a way as to span a considerable space around the tube, so that when the indicator is located over a puncture 2ª in the tube the air issuing therefrom will enter one of the chambers and agitate the member 7 therein, to enable the operator to readily detect the location of the puncture. The arrangement is such that if the strip 3ᵇ should be so held directly over a puncture 2ª that the imperforate portion 3ᵈ of the strip should oppose the puncture the air issuing therefrom in divergent lines will enter one or two of adjacent chambers and cause agitation of one or both of the members 7. My improvement is particularly advantageous for quickly locating punctures because of the spacing of the chambers apart in substantially curved relationship in a row to span a considerable transverse area of an inflated tube, since each chamber will confine its corresponding agitatable member 7 in a relatively small space, any one of which members is subject to agitation by a stream of air anywhere within the extreme limits of the length of the indicator, whereas with the use of an indicator having a single chamber the puncture in a tube is liable to be undetected when the indicator is passed along the tube thereby entailing more arduous effort and time in locating punctures.

Changes may be made in the details of construction set forth, within the scope of the appended claims, without departing from the spirit of my invention.

Having now described my invention what I claim is:

1. An indicator of the character decribed comprising a series of spaced separate hollow transparent cylinders arranged radially in a circularly disposed row and each having its end extending towards the center of the series open at that part adapted to be placed adjacent a tube, a curved frame comprising strips extending along opposite ends of the cylinders, the inner strip having spaced openings registering with the said open ends of the cylinders, the outer strip closing the outer ends of said cylinders, and agitatable members within said cylinders.

2. An indicator of the character described comprising a plurality of spaced hollow transparent cylinders arranged radially in a row and each having its end extending towards the center of the series open at that part adapted to be placed adjacent a tube, means to retain said cylinders in spaced relation, agitatable members within said cylinders, strips extending across said cylinders, said strips being retained between the cylinders and the first named retaining means, and threads connecting said strips with said agitatable members for suspending said members in said cylinder.

3. An indicator of the character described comprising a series of hollow cylinders arranged radially in a row and each having its end extending towards the center of the series open at that part adapted to be placed adjacent a tube, the other ends of the cylinders being closed, a frame securing said cylinders together in spaced relation, said frame having an open side and being disposed to permit air to enter each of said open ends of said cylinders, agitatable members within the cylinders, said frame having projections at the ends, and a cap for the open side of the frame having means for detachably connecting the cap with the frame.

ERNEST M. CATTLEY.